(12) United States Patent
Murakami

(10) Patent No.: US 11,709,302 B2
(45) Date of Patent: *Jul. 25, 2023

(54) PHASE DIFFERENCE FILM AND PRODUCTION METHOD FOR THE SAME

(71) Applicant: ZEON CORPORATION, Tokyo (JP)

(72) Inventor: Toshihide Murakami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,046

(22) Filed: Apr. 28, 2022

(65) Prior Publication Data
US 2022/0252774 A1    Aug. 11, 2022

Related U.S. Application Data

(63) Continuation of application No. 16/891,055, filed on Jun. 3, 2020, now Pat. No. 11,346,991, which is a
(Continued)

(30) Foreign Application Priority Data

Oct. 15, 2015 (JP) .................................. 2015-203855

(51) Int. Cl.
*G02B 5/30* (2006.01)
*B42D 25/364* (2014.01)
(Continued)

(52) U.S. Cl.
CPC ......... *G02B 5/3083* (2013.01); *B42D 25/328* (2014.10); *B42D 25/364* (2014.10);
(Continued)

(58) Field of Classification Search
CPC ................................ G02B 5/3083; C08J 5/18
(Continued)

(56) References Cited

U.S. PATENT DOCUMENTS 5,194,534 A    3/1993 Bell
7,084,944 B2    8/2006 Ito et al.
(Continued)

FOREIGN PATENT DOCUMENTS

JP    H05345817 A    12/1993
JP    2001166140 A    6/2001
(Continued)

OTHER PUBLICATIONS

Apr. 17, 2018, International Preliminary Reporton Patentability issued in the International Patent Application No. PCT/JP2016/080398.
(Continued)

*Primary Examiner* — Ricky D Shafer
(74) *Attorney, Agent, or Firm* — Kenja IP Law PC

(57) ABSTRACT

Provided is a phase difference film formed of a resin containing a polymer having crystallizability. The phase difference film has an NZ factor of less than 1 and an in-plane retardation Re that satisfies 125 nm≤Re≤345 nm. The polymer has a crystallization degree of 15% or more. Alternatively, the polymer is an alicyclic structure-containing polymer being a hydrogenated product of a ring-opening polymer of dicyclopentadiene.

10 Claims, 1 Drawing Sheet

Related U.S. Application Data continuation of application No. 15/766,095, filed as application No. PCT/JP2016/080398 on Oct. 13, 2016, now Pat. No. 10,712,487.

(51) Int. Cl.

| | |
|---|---|
| *B42D 25/328* | (2014.01) |
| *G02B 5/32* | (2006.01) |
| *G02B 5/18* | (2006.01) |
| *C08G 61/08* | (2006.01) |
| *C08J 5/18* | (2006.01) |
| *G02F 1/13363* | (2006.01) |

(52) U.S. Cl.
CPC ............... *C08G 61/08* (2013.01); *C08J 5/18* (2013.01); *G02B 5/18* (2013.01); *G02B 5/30* (2013.01); *G02B 5/32* (2013.01); *G02F 1/133634* (2013.01); *C08G 2261/3324* (2013.01); *C08G 2261/418* (2013.01); *C08J 2365/00* (2013.01); *G02F 1/133638* (2021.01)

(58) Field of Classification Search
USPC .......... 359/489.07, 489.12, 489.13; 427/162
See application file for complete search history.

(56) References Cited

U.S. PATENT DOCUMENTS

| | | | |
|---|---|---|---|
| 9,399,317 | B2 | 7/2016 | Sudeji |
| 10,712,487 | B2 * | 7/2020 | Murakami ............. C08G 61/08 |
| 11,346,991 | B2 * | 5/2022 | Murakami ........... G02B 5/3083 |
| 2006/0077736 | A1 | 4/2006 | Nakagawa et al. |
| 2006/0132688 | A1 | 6/2006 | Yoda et al. |
| 2006/0177607 | A1 | 8/2006 | Ohmori et al. |
| 2007/0211199 | A1 | 9/2007 | Kobayashi et al. |
| 2009/0109385 | A1 | 4/2009 | Nagase et al. |
| 2009/0128759 | A1 | 5/2009 | Yoshimi et al. |
| 2009/0231519 | A1 | 9/2009 | Toyama et al. |
| 2009/0279030 | A1 | 11/2009 | Toyama et al. |
| 2010/0053510 | A1 | 3/2010 | Bitou et al. |
| 2010/0143613 | A1 | 6/2010 | Nimura et al. |
| 2010/0249323 | A1 | 9/2010 | Iida et al. |
| 2012/0302713 | A1 | 11/2012 | Koike et al. |
| 2013/0169910 | A1 | 7/2013 | Hatano et al. |
| 2015/0021810 | A1 * | 1/2015 | Sudeji .................... G02B 5/305 264/173.14 |
| 2016/0109757 | A1 | 4/2016 | Ibaraki |
| 2018/0180787 | A1 | 6/2018 | Inoue et al. |

FOREIGN PATENT DOCUMENTS

| | | |
|---|---|---|
| JP | 2006285169 A | 10/2006 |
| JP | 2008281667 A | 11/2008 |
| JP | 2009241397 A | 10/2009 |
| JP | 2010048889 A | 3/2010 |
| JP | 2015179204 A | 10/2015 |
| JP | 2015222296 A | 12/2015 |
| WO | 2011081101 A1 | 7/2011 |
| WO | 2015094677 A1 | 6/2015 |

OTHER PUBLICATIONS

Aug. 30, 2019, the Extended European Search Report issued by the European Patent Office in the corresponding European Patent Application No. 16855475.6.

Jan. 17, 2017, International Search Report issued in the International Patent Application No. PCT/JP2016/080398.

* cited by examiner

PHASE DIFFERENCE FILM AND PRODUCTION METHOD FOR THE SAME

CROSS-REFERENCE TO RELATED APPLICATION

This application is a continuation of U.S. application Ser. No. 16/891,055 filed Jun. 3, 2020, which is a continuation of U.S. application Ser. No. 15/766,095 filed Apr. 5, 2018, now issued as U.S. Pat. No. 10,712,487, which is a National Stage Application of PCT/JP2016/080398 filed Oct. 13, 2016, which claims priority based on Japanese Patent Application No. 2015-203855 filed Oct. 15, 2015. The disclosures of the prior applications are hereby incorporated by reference herein in their entirety.

FIELD

The present invention relates to a phase difference film and a method for producing the same.

BACKGROUND

It is a common practice to provide a variety of phase difference films in a display device such as a liquid crystal display device.

As a method for producing a phase difference film, a method in which an isotropic primary film is stretched to impart optical anisotropy is widely used. However, with such a production method, it is difficult to produce a certain type of phase difference film. For example, it is difficult to obtain a film having an NZ factor of less than 1, such as a three-dimensional phase difference film, a negative A plate, and a positive C plate, by simply stretching an isotropic film.

As a method for obtaining a phase difference film having a small NZ factor, some methods have been proposed. As one of the methods, a method in which a primary film is bonded to a shrinkable film to obtain a layered film and the layered film is shrunk is known (for example, Patent Literature 1).

CITATION LIST

Patent Literature

Patent Literature 1: Japanese Patent Application Laid-Open No. 2008-281667 A

SUMMARY

Technical Problem

In order to obtain a display device that displays a display image having high quality and has a small thickness, a phase difference film having a thickness smaller than that of prior-art display devices and high expression of phase difference is required. As to the phase difference film having an NZ factor as small as less than 1, in order to realize both thin thickness and high phase difference expression, properties in which Rth is negative and the absolute value of Rth per unit thickness is large are required. However, in order to obtain such a phase difference film by prior-art techniques of Patent Literature 1 and the like, there is a need for large shrinkage given by the shrinkable film. Therefore, it is difficult to easily produce a film having a quality as an optical film.

It is thus an object of the present invention to provide a phase difference film that has a small NZ factor, a small thickness, and high expression of phase difference and can be easily produced, and also provide a production method whereby such a phase difference film can be easily produced.

Solution to Problem

The inventor of the present invention has conducted researches to solve the above-described problems and, as a result, found that when a resin containing a polymer having crystallizability is used as a resin constituting a phase difference film, the above-described problems can be solved.

Therefore, the present invention provides the following.

<1> A phase difference film formed of a resin containing a polymer having crystallizability, the phase difference film having an NZ factor of less than 1.

<2> The phase difference film according to <1>, wherein the NZ factor is 0.7 or less.

<3> The phase difference film according to <1> or <2>, wherein the polymer is an alicyclic structure-containing polymer.

<4> The phase difference film according to <3>, wherein the alicyclic structure-containing polymer is a hydrogenated product of a ring-opening polymer of dicyclopentadiene.

<5> The phase difference film according to any one of <1> to <4>, having an in-plane retardation Re, a thickness-direction retardation Rth, and a thickness d that satisfy a relationship of Re 10 nm and Rth/d$\leq -5\times 10^{-3}$.

<6> A method for producing the phase difference film according to any one of <1> to <5>, comprising:

(1) a bonding step of bonding a second film to one or both surfaces of a first film formed of a resin containing the polymer having crystallizability and having a glass transition temperature Tg (° C.) and a melting point Tm (° C.), to obtain a third film, the second film having a shrinkage percentage in at least one direction at (Tg+30)° C. of 5% or more and 50% or less;

(2) a shrinking step of heating the third film to Tg° C. or higher and (Tg+3)° C. or lower, to cause shrinkage of the third film in at least one direction so that an area thereof is decreased by 5% or more and 50% or less, to obtain a fourth film; and (3) a secondary heating step of heating the fourth film to (Tg+50)° C. or higher and (Tm−40)° C. or lower.

Advantageous Effects of Invention

The phase difference film according to the present invention can have a small NZ factor, a small thickness, and high expression of phase difference and can be easily produced. With the method for producing the phase difference film according to the present invention, such a phase difference film can be easily produced.

DESCRIPTION OF EMBODIMENTS

Figure 1:
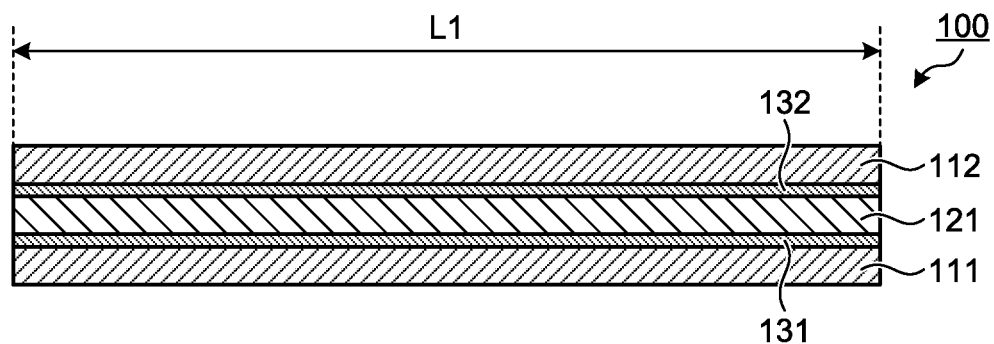
FIG. 1 is a cross-sectional view schematically illustrating one example of a third film in a method for producing a phase difference film according to the present invention.

Hereinafter, the present invention will be described in detail by way of embodiments and examples. However, the present invention is not limited to the following embodiments and examples and may be embodied with any modifications without departing from the scope of the claims of the present invention and equivalents thereto.

Unless otherwise specified in the following description, an in-plane retardation Re of a film is a value represented by "Re=(nx−ny)×d", a thickness-direction retardation Rth of a film is a value represented by "Rth=[{(nx+ny)/2}−nz]×d", and an NZ factor Nz of a film is a value represented by "Nz=(nx−nz)/(nx−ny)=Rth/Re+0.5". In the formulas, nx represents a refractive index in a direction in which the maximum refractive index is given among directions perpendicular to the thickness direction of the film (in-plane directions), ny represents a refractive index in a direction, among the above-mentioned in-plane directions, perpendicular to the direction giving nx, nz represents a refractive index in the thickness direction of the film, and d represents the thickness of the film. The measurement wavelength is 590 nm unless otherwise specified.

In the following description, a direction of an element being "orthogonal" may allow an error within the range of not impairing the advantageous effects of the present invention, for example, within a range of ±5°, unless otherwise specified.

[1. Summary of Phase Difference Film]

The phase difference film of the present invention is formed of a resin containing a polymer having crystallizability, and has a specific NZ factor.

[2. Crystallizable Polymer and Crystallizable Resin]

The polymer having crystallizability means a polymer having a melting point that is measurable by a differential scanning calorimeter (DSC). In the following description, this polymer having crystallizability and a resin containing the polymer may be simply referred to as "crystallizable polymer" and "crystallizable resin", respectively. Since the phase difference film of the present invention is formed of the crystallizable resin, the phase difference film can be a phase difference film that has a small thickness, and high expression of phase difference even with an NZ factor as small as less than 1, and can be easily produced.

As the crystallizable resin, a resin having a positive intrinsic birefringence value is usually used. Therefore, as the crystallizable polymer, a polymer having a positive intrinsic birefringence value is preferably used. The resin and polymer having a positive intrinsic birefringence value herein represent a resin and polymer in which the refractive index in a stretching direction is larger than the refractive index in a direction orthogonal to the stretching direction. The resin and polymer having a negative intrinsic birefringence value represent a resin and polymer in which the refractive index in a stretching direction is smaller than the refractive index in a direction orthogonal to the stretching direction.

As the crystallizable polymer, an alicyclic structure-containing polymer having crystallizability is preferable. The alicyclic structure-containing polymer is a polymer having an alicyclic structure in its molecule obtained through a polymerization reaction using a cyclic olefin as a monomer, or a hydrogenated product of the polymer. Since the alicyclic structure-containing polymer having crystallizability is excellent in heat resistance and low hygroscopicity, a film suitable for an optical film can thereby be achieved. As the alicyclic structure-containing polymer, one type thereof may be solely used, and two or more types thereof may also be used in combination at any ratio.

Examples of the alicyclic structure possessed by the alicyclic structure-containing polymer may include a cycloalkane structure and a cycloalkene structure. Of these, a cycloalkane structure is preferable, because a film having excellent properties such as thermal stability can thereby be easily obtained. The number of carbon atoms contained in one alicyclic structure is preferably 4 or more, and more preferably 5 or more, and is preferably 30 or less, more preferably 20 or less, and particularly preferably 15 or less. When the number of carbon atoms contained in one alicyclic structure falls within the aforementioned range, mechanical strength, heat resistance, and moldability are highly balanced.

The ratio of the structural unit having an alicyclic structure relative to all structural units in the alicyclic structure-containing polymer is preferably 30% by weight or more, more preferably 50% by weight or more, and particularly preferably 70% by weight or more. When the ratio of the structural unit having an alicyclic structure in the alicyclic structure-containing polymer is set at such a high level as previously described, heat resistance can be enhanced.

The remainder other than the structural unit having an alicyclic structure in the alicyclic structure-containing polymer is not particularly limited, and any unit as a unit constituting the remainder may be appropriately selected depending on the purposes of use.

Examples of the aforementioned alicyclic structure-containing polymer may include the following polymer (α) to polymer (δ). Of these, the polymer (β) is preferable as the crystallizable alicyclic structure-containing polymer, because a film having excellent heat resistance can thereby be easily obtained:

Polymer (α): ring-opening polymer of a cyclic olefin monomer, having crystallizability.

Polymer (β): hydrogenated product of polymer (α), having crystallizability.

Polymer (γ): addition polymer of a cyclic olefin monomer, having crystallizability.

Polymer (δ): hydrogenated product of polymer (γ), having crystallizability.

Specifically, the crystallizable alicyclic structure-containing polymer is more preferably a ring-opening polymer of dicyclopentadiene having crystallizability, and a hydrogenated product of the ring-opening polymer of dicyclopentadiene having crystallizability; and particularly preferably a hydrogenated product of the ring-opening polymer of dicyclopentadiene having crystallizability. The ring-opening polymer of dicyclopentadiene herein means a polymer in which the ratio of a dicyclopentadiene-derived structural unit relative to all structural units is usually 50% by weight or more, preferably 70% by weight or more, more preferably 90% by weight or more, and further preferably 100% by weight.

Hereinafter, methods for producing the polymer (α) and the polymer (β) will be described.

The cyclic olefin monomer usable for producing the polymer (α) and the polymer (β) is a compound which has a ring structure formed with carbon atoms and includes a carbon-carbon double bond on the ring. Examples of the cyclic olefin monomer may include a norbornene-based monomer. When the polymer (α) is a copolymer, a single-ring cyclic olefin may be used as the cyclic olefin monomer.

The norbornene-based monomer is a monomer that contains a norbornene ring. Examples of the norbornene-based monomer may include: a bicyclic monomer such as bicyclo[2.2.1]hept-2-ene (common name: norbornene), and 5-ethylidene-bicyclo[2.2.1]hept-2-ene (common name: ethylidene norbornene) and a derivative thereof (for example, with a substituent on the ring); a tricyclic monomer such as tricyclo[4.3.0.1²,⁵]dec-3,7-diene (common name: dicyclopentadiene) and a derivative thereof; and a tetracyclic monomer such as 7,8-benzotricyclo[4.3.0.1²,⁵]dec-3-ene (common name: methanotetrahydrofluorene: also referred to as 1,4-methano-1,4,4a,9a-tetrahydrofluorene) and a derivative thereof, tetracyclo[4.4.0.1²,⁵.1⁷,¹⁰]dodeca-3-ene (common name: tetracyclododecene), and 8-ethylidene tetracyclo[4.4.0.1²,⁵. 1⁷,¹⁰]-3-dodecene and a derivative thereof.

Examples of the substituent in the aforementioned monomer may include: an alkyl group such as a methyl group and an ethyl group; an alkenyl group such as a vinyl group; an alkylidene group such as propane-2-ylidene; an aryl group such as a phenyl group; a hydroxy group; an acid anhydride group; a carboxyl group; and an alkoxycarbonyl group such as a methoxycarbonyl group. The monomer may contain solely one type of the aforementioned substituents, and may also contain two or more types thereof in combination at any ratio.

Examples of the single-ring cyclic olefin may include: cyclic monoolefin such as cyclobutene, cyclopentene, methylcyclopentene, cyclohexene, methylcyclohexene, cycloheptene, and cyclooctene; and cyclic diolefin such as cyclohexadiene, methylcyclohexadiene, cyclooctadiene, methylcyclooctadiene, and phenylcyclooctadiene.

As the cyclic olefin monomer, one type thereof may be solely used, and two or more types thereof may also be used in combination at any ratio. When two or more types of the cyclic olefin monomers are used, the polymer (α) may be a block copolymer, or may be a random copolymer.

Some cyclic olefin monomers may be those having endo- and exo-stereoisomers. As the cyclic olefin monomer, any of the endo- and exo-streoisomers may be used. One of the endo- and exo-streoisomers may be used alone, or an isomer mixture containing the endo- and exo- stereoisomers at any ratio may be used. In particular, it is preferable that the ratio of one of the endo- and exo-stereoisomers is set at a high level because thereby crystallizability of the alicyclic structure-containing polymer is enhanced and a film having excellent heat resistance is easily obtained. For example, the ratio of the endo- or exo-stereoisomer is preferably 80% or more, more preferably 90% or more, and further preferably 95% or more. It is preferable that the ratio of the endo-stereoisomer is at a high level for facilitating synthesis.

The crystallizability of the polymer (α) and the polymer (β) can be usually enhanced by increasing the degree of syndiotactic stereoregularity thereof (ratio of a racemo diad). From the viewpoint of increasing the degree of stereoregularity of the polymer (α) and the polymer (β), the ratio of a racemo diad in the structural units of the polymer (α) and the polymer (β) is preferably 51% or more, more preferably 60% or more, and particularly preferably 70% or more.

The ratio of a racemo diad may be measured by ¹³C-NMR spectrometry. Specifically, the measurement may be performed by the following method.

A polymer sample is subjected to ¹³C-NMR measurement at 200° C. by an inverse-gated decoupling method using o-dichlorobenzene-d⁴ as a solvent. From the result of the ¹³C-NMR measurement, a signal at 43.35 ppm derived from a meso diad and a signal at 43.43 ppm derived from the racemo diad are identified on the basis of a peak at 127.5 ppm of o-dichlorobenzene-d⁴ as a reference shift, and from the intensity ratios thereof, the ratio of the racemo diad of the polymer sample may be determined.

In synthesis of the polymer (α), a ring-opening polymerization catalyst is usually used. As the ring-opening polymerization catalyst, one type thereof may be solely used, and two or more types thereof may also be used in combination at any ratio. It is preferable that such a ring-opening polymerization catalyst for synthesis of the polymer (α) is a ring-opening polymerization catalyst that may cause ring-opening polymerization of the cyclic olefin monomer to produce a ring-opening polymer having syndiotactic stereoregularity. Preferable examples of the ring-opening polymerization catalyst may include ring-opening polymerization catalysts including a metal compound represented by the following formula (A):

$$M(NR^1)X_{4-a}(OR^2)_a \cdot L_b \qquad (A)$$

(wherein

M is a metal atom selected from the group consisting of the Group 6 transition metal atoms in the periodic table, $R^1$ is a phenyl group optionally having a substituent at least one of 3-, 4-, and 5-positions, or a group represented by —$CH_2R^3$ (wherein $R^3$ is a group selected from the group consisting of a hydrogen atom, an alkyl group optionally having a substituent, and an aryl group optionally having a substituent), $R^2$ is a group selected from the group consisting of an alkyl group optionally having a substituent and an aryl group optionally having a substituent, X is a group selected from the group consisting of a halogen atom, an alkyl group optionally having a substituent, an aryl group optionally having a substituent, and an alkylsilyl group, L is a neutral electron-donor ligand, a is a number of 0 or 1, and b is an integer of 0 to 2.)

In the formula (A), M is a metal atom selected from the group consisting of the Group 6 transition metal atoms in the periodic table. M is preferably chromium, molybdenum, or tungsten, more preferably molybdenum or tungsten, and particularly preferably tungsten.

In the formula (A), $R^1$ is a phenyl group optionally having a substituent at at least one of the 3-, 4-, and 5-positions, or a group represented by —$CH_2R^3$.

The number of carbon atoms of the phenyl group optionally having a substituent at at least one of the 3-, 4-, and 5-positions of $R^1$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio. In $R^1$, the substituents present at at least two of the 3-, 4-, and 5-positions may be bonded to each other, to form a ring structure.

Examples of the phenyl group optionally having a substituent at at least one of the 3-, 4-, and 5-positions may include an unsubstituted phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group, and a 3,4,5-trichlorophenyl group; and a 2-naphthyl group optionally having a substituent such as a 2-naphthyl group, a 3-methyl-2-naphthyl group, and a 4-methyl-2-naphthyl group.

In the group represented by —$CH_2R^3$ of $R^1$, $R^3$ is a group selected from the group consisting of a hydrogen atom, an alkyl group optionally having a substituent, and an aryl group optionally having a substituent.

The number of carbon atoms in the alkyl group optionally having a substituent of $R^3$ is preferably 1 to 20, and more preferably 1 to 10. This alkyl group may be either linear or branched. Examples of the substituent may include a phenyl group optionally having a substituent such as a phenyl group and a 4-methylphenyl group; and an alkoxyl group such as a methoxy group and an ethoxy group. As the substituent, one type thereof may be solely used, and two or more types thereof may also be used in combination at any ratio.

Examples of the alkyl group optionally having a substituent of $R^3$ may include a methyl group, an ethyl group, a propyl group, an isopropyl group, a butyl group, an isobutyl group, a t-butyl group, a pentyl group, a neopentyl group, a benzyl group, and a neophyl group.

The number of carbon atoms in the aryl group optionally having a substituent of $R^3$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio.

Examples of the aryl group optionally having a substituent of $R^3$ may include a phenyl group, a 1-naphthyl group, a 2-naphthyl group, a 4-methylphenyl group, and a 2,6-dimethylphenyl group.

Among these, the group represented by $R^3$ is preferably an alkyl group of 1 to 20 carbon atoms.

In the formula (A), $R^2$ is a group selected from the group consisting of an alkyl group optionally having a substituent and an aryl group optionally having a substituent. As the alkyl group optionally having a substituent and the aryl group optionally having a substituent of $R^2$, a group selected from the range of groups enumerated as the alkyl group optionally having a substituent and the aryl group optionally having a substituent, respectively, of $R^3$ may be optionally used.

In the formula (A), X is a group selected from the group consisting of a halogen atom, an alkyl group optionally having a substituent, an aryl group optionally having a substituent, and an alkylsilyl group.

Examples of the halogen atom of X may include a chlorine atom, a bromine atom, and an iodine atom.

As the alkyl group optionally having a substituent and the aryl group optionally having a substituent of X, a group selected from the range of groups enumerated as the alkyl group optionally having a substituent and the aryl group optionally having a substituent, respectively, of $R^3$ may be optionally used.

Examples of the alkylsilyl group of X may include a trimethylsilyl group, a triethylsilyl group, and a t-butyldimethylsilyl group.

When the metal compound represented by the formula (A) has two or more X's in the molecule, the X's may be the same as or different from each other. Further, the two or more X's may be bonded to each other to form a ring structure.

In the formula (A), L is a neutral electron donor ligand.

Examples of the neutral electron donor ligand of L may include an electron donor compound containing an atom of the Group 14 or 15 in the periodic table. Specific examples thereof may include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; and amines such as trimethylamine, triethylamine, pyridine, and lutidine. Among these, ethers are preferable. When the metal compound represented by the formula (A) has two or more L's in the molecule, the L's may be the same as or different from each other.

The metal compound represented by the formula (A) is preferably a tungsten compound having a phenylimido group. That is, a metal compound represented by the formula (A) wherein M is a tungsten atom and $R^1$ is a phenyl group is preferable. In particular, a tetrachlorotungsten phenylimide (tetrahydrofuran) complex is more preferable.

The method for producing the metal compound represented by the formula (A) is not particularly limited. For example, as described in Japanese Patent Application Laid-open No. H05-345817 A, the metal compound represented by the formula (A) may be produced by mixing an oxyhalogenated product of a Group 6 transition metal; a phenyl isocyanate optionally having a substituent at at least one of the 3-, 4-, and 5-positions or a monosubstituted methyl isocyanate; a neutral electron donor ligand (L); and if necessary, an alcohol, a metal alkoxide, and a metal aryloxide.

In the aforementioned production method, the metal compound represented by the formula (A) is usually obtained in a state where the compound is contained in a reaction liquid. After production of the metal compound, the aforementioned reaction liquid as it is may be used as a catalyst liquid for the ring-opening polymerization reaction. Alternatively, the metal compound may be isolated from the reaction liquid and purified by a purification treatment such as crystallization, and the resulting metal compound may be subjected to the ring-opening polymerization reaction.

As the ring-opening polymerization catalyst, the metal compound represented by the formula (A) may be solely used. Alternatively, the metal compound represented by the formula (A) may be used in combination with another component. For example, the metal compound represented by the formula (A) may be used in combination with an organometallic reductant, to enhance polymerization activity.

Examples of the organometallic reductant may include organometallic compounds of Groups 1, 2, 12, 13, and 14 in the periodic table, having a hydrocarbon group of 1 to 20 carbon atoms. Examples of such organometallic compounds may include an organolithium such as methyllithium, n-butyllithium, and phenyllithium; an organomagnesium such as butylethylmagnesium, butyloctylmagnesium, dihexylmagnesium, ethylmagnesium chloride, n-butylmagnesium chloride, and allylmagnesium bromide; an organozinc such as dimethylzinc, diethylzinc, and diphenylzinc; an organoaluminum such as trimethylaluminum, triethylaluminum, triisobutylaluminum, diethylammonium chloride, ethylaluminum sesquichloride, ethylaluminum dichloride, diethylaluminum ethoxide, diisobutylaluminum isobutoxide, ethylaluminum diethoxide, and isobutylaluminum diisobutoxide; and an organotin such as tetramethyltin, tetra(n-butyl) tin, and tetraphenyltin. Among these, an organoaluminum and an organotin are preferable. As the organometallic reductant, one type thereof may be solely used, and two or more types thereof may also be used in combination at any ratio.

The ring-opening polymerization reaction is usually performed in an organic solvent. As the organic solvent, an organic solvent that allows the ring-opening polymer and a hydrogenated product thereof to be dissolved or dispersed under specific conditions and does not inhibit the ring-opening polymerization reaction and a hydrogenation reaction may be used. Examples of such an organic solvent may include an aliphatic hydrocarbon solvent such as pentane, hexane, and heptane; an alicyclic hydrocarbon solvent such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon solvent such as benzene, toluene, and xylene; a halogenated aliphatic hydrocarbon solvent such as dichloromethane, chloroform, and 1,2-dichloroethane; a halogenated aromatic hydrocarbon solvent such as chlorobenzene, and dichlorobenzene; a nitrogen-containing hydrocarbon solvent such as nitromethane, nitrobenzene, and acetonitrile; an ether solvent such as diethyl ether, and tetrahydrofuran; and a mixed solvent obtained by a combination thereof. Among these, the organic solvent is preferably an aromatic hydrocarbon solvent, an aliphatic hydrocarbon solvent, an alicyclic hydrocarbon solvent, or an ether solvent. As the organic solvent, one type thereof may be solely used, and two or more types thereof may also be used in combination at any ratio.

The ring-opening polymerization reaction may be initiated by mixing the cyclic olefin monomer, the metal compound represented by the formula (A), and if necessary, the organometallic reductant. The order of mixing the components is not particularly limited. For example, a solution containing the metal compound represented by the formula (A) and the organometallic reductant may be mixed in a solution containing the cyclic olefin monomer. Alternatively, a solution containing the cyclic olefin monomer and the metal compound represented by the formula (A) may be mixed in a solution containing the organometallic reductant. Further, a solution containing the metal compound represented by the formula (A) may be mixed in a solution containing the cyclic olefin monomer and the organometallic reductant. When the respective components are mixed, the whole amount of each of the components may be mixed at a time. Alternatively, each component may be divided for a plurality of times of mixing. The components may also be continuously mixed over a relatively long period of time (for example, 1 minute or longer).

The concentration of the cyclic olefin monomer in the reaction liquid at start of the ring-opening polymerization reaction is preferably 1% by weight or more, more preferably 2% by weight or more, and particularly preferably 3% by weight or more, and is preferably 50% by weight or less, more preferably 45% by weight or less, and particularly preferably 40% by weight or less. When the concentration of the cyclic olefin monomer is equal to or more than the lower limit value, productivity can be enhanced. When the concentration thereof is equal to or less than the upper limit value, viscosity of the reaction liquid after the ring-opening polymerization reaction can be decreased. Therefore, the subsequent hydrogenation reaction can be facilitated.

The amount of the metal compound represented by the formula (A) used in the ring-opening polymerization reaction is desirably set so that the ratio by mole of "metal compound: cyclic olefin monomer" falls within a specific range. Specifically, the aforementioned ratio by mole is preferably 1:100 to 1:2,000,000, more preferably 1:500 to 1,000,000, and particularly preferably 1:1,000 to 1:500,000. When the amount of the metal compound is equal to or more than the lower limit value, sufficient polymerization activity can be obtained. When the amount thereof is equal to or less than the upper limit value, the metal compound can be easily removed after the reaction.

The amount of the organometallic reductant is preferably 0.1 mol or more, more preferably 0.2 mol or more, and particularly preferably 0.5 mol or more, and is preferably 100 mol or less, more preferably 50 mol or less, and particularly preferably 20 mol or less, relative to 1 mol of the metal compound represented by the formula (A). When the amount of the organometallic reductant is equal to or more than the lower limit value, polymerization activity can be sufficiently enhanced. When the amount thereof is equal to or less than the upper limit value, occurrence of a side reaction can be suppressed.

The polymerization reaction system of the polymer ($\alpha$) may contain an activity adjuster. When the activity adjuster is used, the ring-opening polymerization catalyst can be stabilized, the reaction speed of the ring-opening polymerization reaction can be adjusted, and the molecular weight distribution of the polymer can be adjusted.

As the activity adjuster, an organic compound having a functional group may be used. Examples of the activity adjuster may include an oxygen-containing compound, a nitrogen-containing compound, and a phosphorus-containing organic compound.

Examples of the oxygen-containing compound may include: ethers such as diethyl ether, diisopropyl ether, dibutyl ether, anisole, furan, and tetrahydrofuran; ketones such as acetone, benzophenone, and cyclohexanone; and esters such as ethyl acetate.

Examples of the nitrogen-containing compound may include: nitriles such as acetonitrile and benzonitrile; amines such as triethylamine, triisopropylamine, quinuclidine, and N,N-diethylaniline; and pyridines such as pyridine, 2,4-lutidine, 2,6-lutidine, and 2-t-butyl pyridine.

Examples of the phosphorous-containing compound may include: phosphines such as triphenyl phosphine, tricyclohexyl phosphine, triphenyl phosphate, and trimethyl phosphate; and phosphine oxides such as triphenyl phosphine oxide.

As the activity adjuster, one type thereof may be solely used, and two or more types thereof may also be used in combination at any ratio.

The amount of the activity adjuster in the polymerization reaction system of the polymer ($\alpha$) is preferably 0.01 mol % to 100 mol % relative to 100 mol % of the metal compound represented by the formula (A).

In order to adjust the molecular weight of the polymer ($\alpha$), the polymerization reaction system of the polymer ($\alpha$) may contain a molecular weight adjuster. Examples of the molecular weight adjuster may include: $\alpha$-olefins such as 1-butene, 1-pentene, 1-hexene, and 1-octene; an aromatic vinyl compound such as styrene and vinyl toluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as allyl chloride; a nitrogen-containing vinyl compound such as acrylamide; non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated diene such as 1,3-butadiene, 2-methyl-1,3-butadiene, 2,3-dimethyl-1,3-butadiene, 1,3-pentadiene, and 1,3-hexadiene.

As the molecular weight adjuster, one type thereof may be solely used, and two or more types thereof may also be used in combination at any ratio.

The amount of the molecular weight adjuster in the polymerization reaction system for polymerizing the polymer (α) may be appropriately determined depending on an intended molecular weight. The specific amount of the molecular weight adjuster is preferably 0.1 mol % to 50 mol % relative to the cyclic olefin monomer.

The polymerization temperature is preferably −78° C. or higher, and more preferably −30° C. or higher, and is preferably +200° C. or lower, and more preferably +180° C. or lower.

The polymerization time may be dependent on reaction scale. The specific polymerization time is preferably 1 minute to 1000 hours.

By the aforementioned production method, the polymer (α) may be obtained. By hydrogenating this polymer (α), the polymer (β) may be produced.

Hydrogenation of the polymer (α) may be performed by, for example, supplying hydrogen into the reaction system containing the polymer (α) in the presence of a hydrogenation catalyst according to an ordinary method. When reaction conditions in this hydrogenation reaction are appropriately set, usually the tacticity of the hydrogenated product does not alter by the hydrogenation reaction.

As the hydrogenation catalyst, a homogeneous catalyst or inhomogeneous catalyst that is known as a hydrogenation catalyst for an olefin compound may be used.

Examples of the homogeneous catalyst may include a catalyst including a combination of a transition metal compound and an alkali metal compound such as cobalt acetate/triethylaluminum, nickel acetylacetonate/triisobutylaluminum, titanocene dichloride/n-butyllithium, zirconocene dichloride/sec-butyllithium, and tetrabutoxy titanate/dimethylmagnesium; and a noble metal complex catalyst such as dichlorobis(triphenylphosphine)palladium, chlorohydride-carbonyltris(triphenylphosphine) ruthenium, chlorohydride-carbonylbis(tricyclohexylphosphine) ruthenium, bis(tricyclohexylphosphine)benzylidyne ruthenium (IV) dichloride, and chlorotris(triphenylphosphine)rhodium.

Examples of the inhomogeneous catalyst may include a metal catalyst such as nickel, palladium, platinum, rhodium, and ruthenium; and a solid catalyst in which the aforementioned metals are supported on a carrier such as carbon, silica, diatomaceous earth, alumina, and titanium oxide, such as nickel/silica, nickel/diatomaceous earth, nickel/alumina, palladium/carbon, palladium/silica, palladium/diatomaceous earth, and palladium/alumina.

As the hydrogenation catalyst, one type thereof may be solely used, and two or more types thereof may also be used in combination at any ratio.

The hydrogenation reaction is usually performed in an inactive organic solvent. Examples of the inactive organic solvent may include: an aromatic hydrocarbon solvent such as benzene and toluene; an aliphatic hydrocarbon solvent such as pentane and hexane; an alicyclic hydrocarbon solvent such as cyclohexane and decahydronaphthalene; and an ether solvent such as tetrahydrofuran and ethylene glycol dimethyl ether. As the inactive organic solvent, one type thereof may be solely used, and two or more types thereof may also be used in combination at any ratio. The inactive organic solvent may be the same as or different from the organic solvent used in the ring-opening polymerization reaction. Furthermore, the hydrogenation reaction may be performed by mixing the hydrogenation catalyst with the reaction liquid of the ring-opening polymerization reaction.

The reaction conditions for the hydrogenation reaction usually vary depending on the hydrogenation catalyst used.

The reaction temperature of the hydrogenation reaction is preferably −20° C. or higher, more preferably −10° C. or higher, and particularly preferably 0° C. or higher, and is preferably +250° C. or lower, more preferably +220° C. or lower, and particularly preferably +200° C. or lower. When the reaction temperature is equal to or higher than the lower limit value, the reaction rate can be increased. Also, when the reaction temperature is equal to or lower than the upper limit value, occurrence of a side reaction can be suppressed.

The hydrogen pressure is preferably 0.01 MPa or more, more preferably 0.05 MPa or more, and particularly preferably 0.1 MPa or more, and is preferably 20 MPa or less, more preferably 15 MPa or less, and particularly preferably 10 MPa or less. When the hydrogen pressure is equal to or more than the lower limit value, reaction rate can be increased. When the hydrogen pressure is equal to or less than the upper limit value, a special apparatus such as a highly pressure resistant reaction vessel is not required, and facility costs can thereby be suppressed.

The reaction time of the hydrogenation reaction may be set to any length of time during which a desired hydrogenation rate is achieved, and preferably 0.1 hours to 10 hours.

After the hydrogenation reaction, the polymer (β), which is the hydrogenated product of the polymer (α), is usually collected according to a conventional method.

The hydrogenation rate (the ratio of a hydrogenated main-chain double bond) in the hydrogenation reaction is preferably 98% or more, and more preferably 99% or more. As the hydrogenation rate becomes higher, the heat resistance of the alicyclic structure-containing polymer can be made more favorable.

The hydrogenation rate of the polymer herein may be measured by a $^1$H-NMR measurement at 145° C., with o-dichlorobenzene-$d^4$ as a solvent.

Subsequently, methods for producing the polymer (γ) and the polymer (δ) will be described.

As the cyclic olefin monomer to be used for producing the polymers (γ) and (δ), those selected from the range of monomers enumerated as the cyclic olefin monomer to be used for producing the polymer (α) and the polymer (β) may be optionally used. As the cyclic olefin monomer, one type thereof may be solely used, and two or more types thereof may also be used in combination at any ratio.

In the production of the polymer (γ), an optional monomer which is copolymerizable with a cyclic olefin monomer may be used as a monomer in combination with the cyclic olefin monomer. Examples of the optional monomer may include: α-olefin of 2 to 20 carbon atoms such as ethylene, propylene, 1-butene, 1-pentene, and 1-hexene; an aromatic ring vinyl compound such as styrene and α-methylstyrene; and non-conjugated diene such as 1,4-hexadiene, 4-methyl-1,4-hexadiene, 5-methyl-1,4-hexadiene, and 1,7-octadiene. Of these, α-olefin is preferable, and ethylene is more preferable. As the optional monomer, one type thereof may be solely used, and two or more types thereof may also be used in combination at any ratio.

The ratio between the cyclic olefin monomer and the optional monomer in terms of a weight ratio (cyclic olefin monomer: optional monomer) is preferably 30:70 to 99:1, more preferably 50:50 to 97:3, and particularly preferably 70:30 to 95:5.

When two or more types of cyclic olefin monomers are used, or when the cyclic olefin monomer and the optional monomer are used in combination, the polymer (γ) may be a block copolymer, or may be a random copolymer.

For the synthesis of the polymer (γ), an addition polymerization catalyst is usually used. Examples of the addition polymerization catalyst may include a vanadium-based catalyst formed from a vanadium compound and an organoaluminum compound, a titanium-based catalyst formed from a titanium compound and an organoaluminum compound, and a zirconium-based catalyst formed from a zirconium complex and aluminoxane. As the addition polymerization catalyst, one type thereof may be solely used, and two or more types thereof may also be used in combination at any ratio.

The amount of the addition polymerization catalyst is preferably 0.000001 mol or more, and more preferably 0.00001 mol or more, and is preferably 0.1 mol or less, and more preferably 0.01 mol or less, relative to 1 mol of a monomer.

The addition polymerization of a cyclic olefin monomer is usually performed in an organic solvent. As the organic solvent, a solvent selected from the range of solvents enumerated as the organic solvent which may be used for the ring-opening polymerization of a cyclic olefin monomer may be optionally used. As the organic solvent, one type thereof may be solely used, and two or more types thereof may also be used in combination at any ratio.

The polymerization temperature in the polymerization for producing the polymer (γ) is preferably −50° C. or higher, more preferably −30° C. or higher, and particularly preferably −20° C. or higher, and is preferably 250° C. or lower, more preferably 200° C. or lower, and particularly preferably 150° C. or lower. The polymerization time is preferably 30 minutes or more, and more preferably 1 hour or more, and is preferably 20 hours or less, and more preferably 10 hours or less.

By the aforementioned production method, the polymer (γ) may be obtained. By hydrogenating this polymer (γ), the polymer (δ) may be produced.

The hydrogenation of the polymer (γ) may be performed by a similar method to the method previously described as a method for hydrogenating the polymer (α).

[3. Properties of Crystallizable Polymer]

In the phase difference film of the present invention, the crystallization degree of the crystallizable polymer is usually 15% or more, preferably 20% or more, and more preferably 25% or more. When crystallization is promoted to the crystallization degree as high as the values described above, the phase difference film may have an NZ factor as small as less than 1.0. When the crystallization degree of the crystallizable polymer is equal to or more than the lower limit value, high heat resistance and chemical resistance can usually be imparted to the film. The upper limit of crystallization degree of the crystallizable polymer is not limited, but is preferably 70% or less.

The crystallization degree of the polymer may be measured by an X-ray diffraction method.

The melting point of the crystallizable polymer is preferably 200° C. or higher, and more preferably 230° C. or higher, and is preferably 290° C. or lower. When a polymer having such a melting point is used, there can be obtained a phase difference film having a further excellent balance between moldability and heat resistance. The polymer having such a melting point can facilitate the production of a phase difference film having a low NZ factor by the method described below.

The weight-average molecular weight (Mw) of the crystallizable polymer is preferably 1,000 or more, and more preferably 2,000 or more, and is preferably 1,000,000 or less, and more preferably 500,000 or less. The polymer having such a weight-average molecular weight has an excellent balance between molding processability and heat resistance.

The molecular weight distribution (Mw/Mn) of the crystallizable polymer is preferably 1.0 or more, and more preferably 1.5 or more, and is preferably 4.0 or less, and more preferably 3.5 or less. Mn herein represents a number-average molecular weight. The polymer having such a molecular weight distribution is excellent in molding processability.

The weight-average molecular weight (Mw) and the molecular weight distribution (Mw/Mn) of the crystallizable polymer may be measured as a polystyrene-equivalent value by gel permeation chromatograph (GPC) using tetrahydrofuran as a development solvent.

The glass transition temperature of the crystallizable polymer is not particularly limited, and is usually in a range of 85° C. or higher and 170° C. or lower.

[4. Optional Component of Crystallizable Resin]

The ratio of the crystallizable polymer in the crystallizable resin is preferably 50% by weight or more, more preferably 70% by weight or more, and particularly preferably 90% by weight or more. When the ratio of the crystallizable polymer is equal to or more than the lower limit value, heat resistance of the phase difference film can be enhanced.

In addition to the crystallizable polymer, the crystallizable resin may contain an optional component. Examples of the optional component may include an antioxidant such as a phenolic antioxidant, a phosphorus-based antioxidant, and an sulfur-containing antioxidant; a light stabilizer such as a hindered amine-based light stabilizer; wax such as petroleum-based wax, Fischer-Tropsch Wax, and polyalkylene wax; a nucleating agent such as a sorbitol-based compound, a metal salt of an organic phosphoric acid, a metal salt of an organic carboxylic acid, kaolin, and talc; a fluorescent whitening agent such as a diaminostilbene derivative, a coumarin derivative, an azole-based derivative (for example, a benzoxazole derivative, a benzotriazole derivative, a benzimidazole derivative, and a benzotiazole derivative), a carbazole derivative, a pyridine derivative, a naphthalic acid derivative, and an imidazolone derivative; a ultraviolet absorber such as a benzophenone-based ultraviolet absorber, a salicylic acid-based ultraviolet absorber, and a benzotriazole-based ultraviolet absorber; an inorganic filler such as talc, silica, calcium carbonate, and glass fibers; a colorant; a flame retardant; a flame retardant promoter; an antistatic agent; a plasticizer; a near-infrared absorber; a lubricant; a filler; and any polymer other than the crystallizable polymer, such as a soft polymer. As the optional component, one type thereof may be solely used, and two or more types thereof may also be used in combination at any ratio.

[5. Properties of Phase Difference Film]

The phase difference film of the present invention has an NZ factor of less than 1. A film having such a property can be easily produced as the phase difference film of the present invention by employing the crystallizable resin as the resin constituting the phase difference film of the present invention, and employing a production method described later as the production method. The NZ factor of the phase difference film of the present invention may be adjusted to a desired value in a range of less than 1 according to its use applications. The NZ factor is preferably 0.7 or less. The lower limit of the NZ factor is not particularly limited, and for example, may be $-1 \times 10^{-6}$ or more.

The phase difference film of the present invention may have properties suitable for use as a positive C plate, a negative A plate, or a three-dimensional phase difference film.

[5.1. Positive C Plate]

In a positive C plate, nx, ny, and nz thereof are values that satisfy a relationship of nz>nx=ny, or values close to the values. Therefore, the in-plane retardation Re thereof is 0 or a value close to 0, and Rth is less than 0.

When the phase difference film of the present invention is used as the positive C plate, the in-plane retardation Re thereof is preferably 30 nm or less, more preferably 10 nm or less, and further preferably 5 nm or less. The lower limit of the Re is not particularly limited, but may be 0 nm or more.

The thickness-direction retardation Rth may be adjusted to a desired value according to its use applications. When the phase difference film is thick, the Rth can be easily set to a high value. However, from the viewpoint of decreasing the thickness of the display device, it is preferable that the thickness d of the phase difference film is small. Therefore, from the viewpoint of obtaining a desired Rth value and obtaining a thin phase difference film, it is preferable that a value of Rth/d is small (i.e., a value of Rth/d is negative and the absolute value thereof is large). Specifically, the value of Rth/d is preferably $-5 \times 10^{-3}$ or less, more preferably $-6 \times 10^{-3}$ or less, and further preferably $-7 \times 10^{-3}$ or less.

[5.2. Negative A Plate]

In a negative A plate, nx, ny, and nz thereof are values that satisfy a relationship of nz=nx>ny, or values close to the values. Therefore, an NZ factor thereof is 0 or a value close to 0, and Rth is less than 0.

When the phase difference film of the present invention is used as the negative A plate, the NZ factor thereof is preferably −0.2 or more, and more preferably −0.1 or more, and is further preferably 0.2 or less, and more preferably 0.1 or less. The NZ factor is particularly preferably 0.

The in-plane retardation Re thereof may be adjusted to a desired value according to its use applications. The retardation Re is usually 30 to 350 nm.

The thickness-direction retardation Rth thereof may be adjusted to a desired value according to its use applications. Like the positive C plate, the negative A plate may preferably has a small value of Rth/d. Specifically, the value of Rth/d is preferably $-5 \times 10^{-3}$ or less, more preferably $-6 \times 10^{-3}$ or less, and further preferably $-7 \times 10^{-3}$ or less.

[5.3. Three-Dimensional Phase Difference Film]

The three-dimensional phase difference film is a film having an NZ factor of 0<Nz<1.

When the phase difference film of the present invention is used as the three-dimensional phase difference film, its Re may be adjusted to a desired value according to its use applications. For example, when the phase difference film of the present invention is used as a quarter-wave plate for visible light, Re may be 125 to 170 nm. Further, for example, when the phase difference film of the present invention is used as a half-wave plate for visible light, Re may be 245 to 345 nm.

The three-dimensional phase difference film may be used as a phase difference film having reduced incidence angle dependency of Re. From this viewpoint, the NZ factor (Rth/Re+0.5) is preferably 0.3 or more and 0.7 or less, more preferably 0.4 or more and 0.6 or less, and particularly preferably 0.5.

[5.4. Other Properties]

The phase difference film of the present invention may preferably have excellent transparency. Specifically, the total light transmittance of the phase difference film of the present invention is preferably 70% or higher, more preferably 80% or higher, and particularly preferably 90% or higher. The total light transmittance may be measured at a wavelength range of 400 nm to 700 nm by using an ultraviolet-visible spectrophotometer.

The phase difference film of the present invention may preferably have low haze. Specifically, the haze of the phase difference film of the present invention is preferably 10% or less, more preferably 5% or less, and particularly preferably 3% or less. The haze of a film may be measured as follows. The film is cut out at a randomly selected portion to obtain a thin-layer sample having a square shape of 50 mm×50 mm. As the haze of the film, the haze of the thin-layer sample may be measured by using a haze meter.

[6. Thickness of Phase Difference Film]

It is preferable that the thickness of the phase difference film of the present invention is small. However, the thickness of the phase difference film may be set to a desired value according to its use applications. The thickness of the phase difference film of the present invention is preferably 3 μm or more, and more preferably 10 μm or more, and is preferably 100 μm or less, and more preferably 50 μm or less. When the thickness of the film is equal to or more than the lower limit value, mechanical strength of the film can be enhanced. When the thickness of the film is equal to or more than the lower limit value, handleability of the film can be improved. When the thickness of the film is equal to or less than the upper limit value, winding of the phase difference film during continuous production can be easily performed.

[7. Method for Producing Phase Difference Film]

The phase difference film of the present invention may be produced by imparting a phase difference to a film formed of the crystallizable resin. Specifically, the phase difference film may be produced by a production method including the following steps (1) to (3). Hereinafter, the production method will be described as the method for producing a phase difference film of the present invention.

Step (1): a bonding step of bonding a second film to one or both surfaces of a first film formed of a resin that contains the polymer having crystallizability and has a glass transition temperature Tg (° C.) and a melting point Tm (° C.), to obtain a third film, wherein the second film has a shrinkage percentage in at least one direction at (Tg+30° C. of 5% or more and 50% or less.

Step (2): a shrinking step of heating the third film to Tg° C. or higher and (Tg+30° C. or lower, to cause shrinkage of the third film in at least one direction so that the area thereof is decreased by 5% or more and 50% or less, to obtain a fourth film.

Step (3): a secondary heating step of heating the fourth film to (Tg+50° C. or higher and (Tm−40° C. or lower.

According to the production method of the present invention including the steps (1) to (3), the phase difference film having a small NZ factor, a small thickness, and high expression of phase difference can be easily produced. In particular, a combination of the steps (2) and (3) makes it possible to easily produce the phase difference film having a small NZ factor and a small thickness, whereas it is difficult to produce such a phase difference film by a prior-art method.

[7.1. Preparation of First Film]

The first film used in the production method of the present invention is a film formed of the crystallizable resin. Examples of a method for producing the first film may include resin molding methods such as an injection molding method, an extrusion molding method, a press molding method, an inflation molding method, a blow molding method, a calendar molding method, a cast molding method, and a compression molding method. Among these, an extrusion molding method is preferable because the thickness can be easily controlled.

When the first film is produced by the extrusion molding method, the production conditions in the extrusion molding method are preferably as follows. The temperature of a cylinder (melted resin temperature) is preferably Tm or higher, and more preferably (Tm+20° C. or higher, and is preferably (Tm+100° C. or lower, and more preferably (Tm+50° C. or lower. The temperature of a casting roller is preferably (Tg−50° C. or higher, and is preferably (Tg+70° C. or lower, and more preferably (Tg+40° C. or lower. The temperature of a cooling roller is preferably (Tg−70° C. or higher, and more preferably (Tg−50° C. or higher, and is preferably (Tg+60° C. or lower, and more preferably (Tg+30° C. or lower. When the first film is produced under such conditions, the first film having a desired thickness can be easily produced. Herein, "Tm" is the melting point of the crystallizable resin, and "Tg" is the glass transition temperature of the crystallizable resin.

The first film may be a film to which a phase difference has already been imparted by any operation. From the viewpoint of easy production, it is preferable that the first film is an isotropic film to which a phase difference is not imparted. Specifically, the Re is desirably 20 nm or less.

The thickness of the first film may be optionally set depending on the thickness of the phase difference film to be produced, and is preferably 5 μm or more, more preferably 10 μm or more, and particularly preferably 20 μm or more, and is preferably 500 μm or less, more preferably 300 μm or less, further preferably 200 μm or less, and particularly preferably 100 μm or less.

[7.2. Second Film]

As to the second film used in the production method of the present invention, the shrinkage percentage thereof in at least one direction at (Tg+30° C. is 5% or more and 50% or less.

Herein, a shrinkage percentage (%) of a film in one direction is a value determined by an expression of ((L1−L2)/L1)×100, wherein L1 is the length of the film before shrinkage in the direction and L2 is the length of the film after shrinkage. In contrast, the stretching percentage (%) of a film in one direction is a value determined by an expression of ((L4−L3)/L3)×100, wherein L3 is the length of the film before stretching in the direction and L4 is the length of the film after stretching. Therefore, the shrinkage percentage can be represented by a negative stretching percentage, and the stretching percentage can be represented by a negative shrinkage percentage. Herein, the shrinkage percentage of a film at a specific temperature means a shrinkage percentage that is expressed after the film is placed in an atmosphere of the specific temperature, and heated until shrinkage is completed. Therefore, the shrinkage percentage of a film of the crystallizable resin at (Tg+30° C. means a shrinkage percentage that is expressed after the film is placed in an atmosphere of a temperature higher than the glass transition temperature of the resin by 30° C., and heated until shrinkage is completed.

As the second film, a film that has been subjected to a stretching treatment in advance may be used. By appropriately adjusting the stretching percentage in the stretching treatment, such a film can become a shrinkage film that expresses a desired shrinkage percentage in the step (2). Stretching may be uniaxial stretching, that is, stretching in one in-plane direction of the film, biaxial stretching, that is, stretching in two in-plane directions orthogonal to each other of the film, or another manner of stretching. The stretching ratio may be appropriately adjusted so as to express a desired shrinkage percentage in the step (2). In a case of uniaxial stretching, for example, the stretching percentage in the direction is preferably 10% or more, and more preferably 20% or more, and is preferably 300% or less, and more preferably 200% or less. In a case of biaxial stretching, for example, the stretching percentage in each direction is preferably 5% or more, and more preferably 10% or more, and is preferably 200% or less, and more preferably 150% or less.

When the shrinkage percentage of the second film in one direction at (Tg+30° C. is 5% or more and 50% or less, the shrinkage percentage in another direction at (Tg+30° C. is not particularly limited. The shrinkage percentage in the other direction may be appropriately adjusted so as to obtain a phase difference film having desired optical properties.

For example, when it is intended to obtain a positive C plate as the phase difference film, a shrinkage film having a shrinkage percentage of 5% or more and 50% or less in a direction and the same shrinkage percentage in a direction orthogonal to the direction (biaxially stretched film, etc.) is preferably used. For example, when the negative A plate is obtained as the phase difference film, a shrinkage film that has a shrinkage percentage of 5% or more and 50% or less in a direction and does not express a large shrinkage percentage in a direction orthogonal to the direction (uniaxially stretched film, etc.) is preferably used.

A material constituting the second film is not particularly limited, and may be any resin that is capable of expressing shrinkage. The material is preferably a material that expresses shrinkage at a temperature suitable for deformation of the first film. Therefore, a material having a glass transition temperature close to the glass transition temperature of the first film is preferable. Specifically, it is preferable that the glass transition temperature TgS (° C.) of the second film and the glass transition temperature Tg (° C.) of the first film satisfy a relationship of Tg−10≤TgS Tg+30. Preferable examples of the material may include the same materials as those exemplified as the crystallizable resin constituting the first film. Further, as the material constituting the second film, a resin containing the same polymer as the crystallizable polymer constituting the first film is more preferably used.

The thickness of the second film may be appropriately set so that shrinkage in the step (2) can be expressed at a desired shrinkage percentage. Specifically, the thickness is preferably 30 μm or more, and more preferably 50 μm or more, and is preferably 1 mm or less, and more preferably 500 μm or less.

Other examples of the second film may include commercially available shrinkable films. The commercially available shrinkable film may be used as it is, or after a secondary processing such as a stretching treatment and a shrinkage treatment. Specific examples of the commercially available shrinkable film may include trade name "ALPHAN" series available from Oji Paper Co., Ltd., trade name "FANCYTOP" series available from Gunze Limited, trade name "TORAYFAN" series available from Toray Industries, Inc., trade name "SunTox-OP" series available from SunTox Co., Ltd., and trade name "Tohcello OP" series available from Tohcello Co., Ltd.

[7.3. Step (1): Bonding Step]

In the step (1), the second film is bonded to the first film, to obtain the third film. The second film may be bonded to only one surface of the first film. From the viewpoint of reducing a bend in or after the step (2), it is preferable that the second film is bonded to both surfaces of the first film.

The bonding may be performed via an adhesive. By performing the bonding via the adhesive, expression of favorable phase difference in or after the step (2) can be achieved. As such an adhesive, for example, an acrylic, silicone-based, polyester-based, polyurethane-based, polyether-based, or rubber-based adhesive may be appropriately used. The adhesive is not particularly limited. The adhesive is preferably an adhesive that forms an adhesive layer whose bonding force does not tend to be increased by a heat shrinkage treatment of the second film. The thickness of the adhesive layer formed from the adhesive is not particularly limited, and may be appropriately adjusted so as to achieve favorable adhesion. Specifically, the thickness of the adhesive layer is preferably 1 µm or more, and more preferably 5 µm or more, and is preferably 50 µm or less, and more preferably 30 µm or less.

When the second film is bonded to the both surfaces of the first film via the adhesive layer, the third film having a layer structure of (second film)/(adhesive layer)/(first film)/(adhesive layer)/(second film) is obtained. FIG. 1 is a cross-sectional view schematically illustrating one example of such a third film. In FIG. 1, a third film 100 includes a first film 121, adhesive layers 131 and 132 that are disposed on both surfaces of the first film, and second films 111 and 112 that are bonded to the first film 121 via the adhesive layers. The third film 100 has a length represented by an arrow L1.

[7.4. Step (2): Shrinking Step]

In the step (2), the third film is heated and shrunk in at least one direction, to obtain a fourth film. The range of heating temperature may be set relative to the Tg of the first film. Specifically, the heating temperature is Tg° C. or higher, and preferably (Tg+5° C. or higher, and is (Tg+30° C. or lower, and preferably (Tg+25° C. or lower. The shrinkage direction of the third film in the step (2) may be an in-plane direction of the third film, that is, any direction parallel to the plane of the film. For example, when the third film has a rectangular shape, the shrinkage direction may be a direction parallel to one side of the rectangular shape, a direction perpendicular to the side, a direction diagonal to the directions, or a combination thereof. More specifically, when the third film has a long-length shape that is formed continuously, the shrinkage direction may be a lengthwise direction of the long-length shape, a width direction of the long-length shape, a direction diagonal to the directions, or a combination thereof.

In the step (2), the third film is heated to decrease the area of the third film. The shrinkage percentage by area of the third film is 5% or more, and preferably 10% or more, and is 50% or less, and preferably 40% or less. The shrinkage percentage (%) by area of a film is a value determined by an expression of $((S1-S2)/S1)\times100$, wherein S1 is the area of the film before shrinkage, and S2 is the area of the film after shrinkage. The shrinkage percentage by area of the film may be calculated from the shrinkage percentage by length of the film in two orthogonal directions. Such shrinkage can be achieved by employing the aforementioned second film and heating temperature, appropriately adjusting the heating time so as to achieve such shrinkage, and performing heating operation until the shrinkage percentage reaches a target value.

It is preferable that heating in the step (2) is performed while a tension is applied to the third film to a degree whereby slack of the third film does not occur. Specifically, such heating is performed by performing support of achieving shrinkage of the third film while maintaining a state where slack of the third film does not occur. The manner of support may be decreasing the tension applied to the third film in accordance with shrinkage of the third film by heating, or decreasing the size of the third film supported in accordance with shrinkage of the third film by heating.

By performing such a shrinking step, the size in the in-plane direction of the first film can be decreased. When the size in the in-plane direction of the first film is decreased, the thickness of the first film is increased. By the size decrease in the in-plane direction and the thickness increase, optical anisotropy is expressed in the first film. Thus, the phase difference film having a small NZ factor can be produced.

Figure 2:
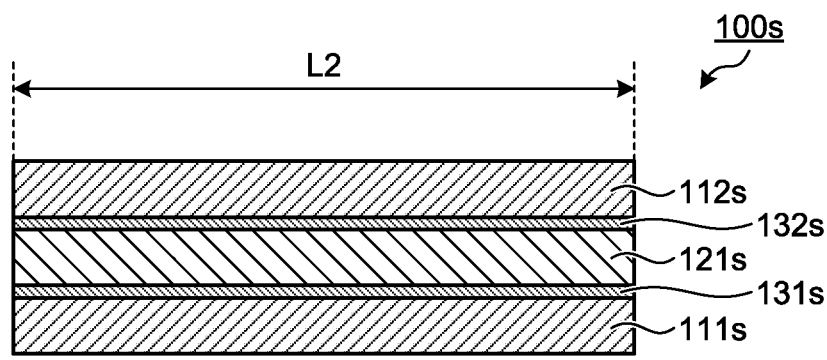
FIG. 2 is a cross-sectional view schematically illustrating one example of a fourth film in the method for producing a phase difference film according to the present invention.

FIG. 2 is a cross-sectional view schematically illustrating one example of such a fourth film. In FIG. 2, a fourth film 100s is a fourth film obtained by shrinkage of the second films 111 and 112 in the third film shown in FIG. 1. That is, the fourth film 110s includes shrunk second films 111s and 112s, which are obtained by shrinkage of the second films 111 and 112.

The second films 111 and 112 have the length represented by the arrow L1 in FIG. 1. The second films 111s and 112s have a length represented by an arrow L2 that is shorter than L1. In the fourth film 100s, the first film 121 and the adhesive layers 131 and 132 are also shrunk with the shrinkage. Thus, the shrunk first film 121s and the shrunk adhesive layers 131s and 132s are formed. The thickness of the first film 121s is increased due to the shrinkage. Therefore, in the shrunk first film 121s, a phase difference is expressed.

Heating in the step (2) may be performed by an operation of effecting shrinkage of the third film in one direction and effecting stretching of the third film in another direction. For example, such an operation may be achieved by performing, in a direction in which the third film is to be shrunk, support of the third film for achieving shrinkage of the third film while maintaining the non-slack state of the third film in accordance with the shrinkage of the third film by heating, while performing, in a direction in which the third film is to be stretched, operation of stretching the third film.

[7.5. Step (3): Secondary Heating Step]

In the step (3), the fourth film is heated. The heating is a heating subsequent to the heating in the step (2). Thus the heating in the step (3) is referred to herein as "secondary heating".

It is preferable that the secondary heating in the step (3) is performed with maintaining the size of the fourth film that has been fixed at the time point of completion of the step (2). By performing such secondary heating, the crystallization degree of the crystallizable polymer in the shrunk first film in the third film is increased. The increased crystallization degree leads to further enhancement of anisotropy in the first film. As a result, the phase difference film having a small NZ factor, a small thickness, and high expression of phase difference can be easily produced.

A specific operation for the secondary heating in the step (3) is not particularly limited. The operation may be performed by a procedure in which, while the state of fixing the size of the fourth film is maintained, a heater is placed at a proximity of the film, or the film is allowed to pass through an oven or a room of a furnace that is heated to a specific temperature.

The temperature of the secondary heating in the step (3) is (Tg+50° C. or higher, and preferably ((Tg+Tm)/2−25° C. or higher, and is (Tm−40° C. or lower, and preferably ((Tg+Tm)/2+40° C. or lower. The time of the secondary heating is preferably 5 seconds or more, and more preferably 10 seconds or more, and is preferably 120 seconds or less, and more preferably 60 seconds or less. By heating in such a temperature range, the crystallization degree of the crystallizable polymer can be largely increased.

After completion of the treatment in the step (3), an optional post-treatment may be performed, if necessary. As a result, a film in which the first film is shrunk and the crystallization degree is further enhanced can be obtained as the phase difference film. Examples of the optional post-treatment may include cooling of the fourth film, and separation of the second film and the adhesive layer after shrinkage from the fourth film.

EXAMPLES

Hereinafter, the present invention will be specifically described by illustrating Examples. However, the present invention is not limited to the following Examples. The present invention may be implemented with any modifications without departing from the scope of claims of the present invention and its equivalents.

Unless otherwise stated, "%" and "part" that represent an amount in the following description are on the basis of weight. Unless otherwise stated, operations described below were performed under conditions of normal temperature and normal pressure.

[Evaluation Method]

[Method for Measuring Weight-Average Molecular Weight and Number-Average Molecular Weight)

The weight-average molecular weight and number-average molecular weight of a polymer were measured as polystyrene-equivalent values using a gel permeation chromatography (GPC) system ("HLC-8320" manufactured by Tosoh Corporation). In the measurement, an H-type column (manufactured by Tosoh Corporation) was used as a column, and tetrahydrofuran was used as a solvent. The temperature in the measurement was 40° C.

[Method for Measuring Glass Transition Temperature Tg and Melting Point Tm]

A sample heated to 300° C. in a nitrogen atmosphere was quenched with liquid nitrogen, and the glass transition temperature Tg and melting point Tm of the sample were each determined using a difference scanning calorimeter (DSC) with temperature elevation at 10° C./min.

[Method for Measuring Hydrogenation Rate of Polymer]

The hydrogenation rate of the polymer was measured by $^1$H-NMR measurement at 145° C. using o-dichlorobenzene-$d^4$ as a solvent.

[Method for Measuring Ratio of Racemo Diad of Polymer]

The polymer was subjected to $^{13}$C-NMR measurement at 200° C. by an inverse-gated decoupling method using o-dichlorobenzene-$d^4$ as a solvent. From results of the $^{13}$C-NMR measurement, the ratio of a racemo diad of the polymer was determined on the basis of intensity ratios of a signal at 43.35 ppm derived from a meso diad and a signal at 43.43 ppm derived from the racemo diad relative to a peak at 127.5 ppm of o-dichlorobenzene-$d^4$ as a reference shift.

[Method for Measuring Re, Rth, and NZ factor of Phase Difference Film]

The Re, Rth, and NZ factor of a phase difference film were measured by AxoScan OPMF-1 produced by Axometrics, Inc.

Production Example 1: Production of Hydrogenated Product of Ring-Opening Polymer of Dicyclopentadiene A metal pressure-resistant reaction vessel was sufficiently dried, and the inside thereof was replaced with nitrogen. In the metal pressure-resistant reaction vessel, 154.5 parts of cyclohexane, 42.8 parts of a solution of 70% dicyclopentadiene (endo-stereoisomer content: 99% or more) in cyclohexane (dicyclopentadiene amount: 30 parts), and 1.9 parts of 1-hexene were charged, and warmed to 53° C.

0.014 parts of tetrachlorotungsten phenylimide (tetrahydrofuran) complex was dissolved in 0.70 parts of toluene, to prepare a solution. To the solution, 0.061 parts of a solution of 19% diethylaluminum ethoxide in n-hexane was added, and the mixture was stirred for 10 minutes, to prepare a catalyst solution.

The catalyst solution was poured into the pressure-resistant reaction vessel to initiate a ring-opening polymerization reaction. After that, the reaction was performed for 4 hours while the temperature was kept at 53° C. As a result, a solution of a ring-opening polymer of dicyclopentadiene was obtained.

The number-average molecular weight (Mn) and weight-average molecular weight (Mw) of the obtained ring-opening polymer of dicyclopentadiene were 8,750 and 28,100, respectively. The molecular weight distribution (Mw/Mn) calculated from the number-average molecular weight (Mn) and the weight-average molecular weight (Mw) was 3.21.

To 200 parts of the obtained solution of the ring-opening polymer of dicyclopentadiene, 0.037 parts of 1,2-ethanediol was added as a terminator. The mixture was warmed to 60° C. and stirred for 1 hour, to terminate the polymerization reaction. To the mixture, 1 part of a hydrotalcite-like compound ("KYOWAAD (registered trademark) 2000" available from Kyowa Chemical Industry Co., Ltd.) was added. The mixture was warmed to 60° C. and stirred for 1 hour. After that, 0.4 parts of a filtration aid ("RADIOLITE (registered trademark) #1500" available from Showa Chemical Industry Co., Ltd.) was added, and the mixture was filtered through a PP pleated cartridge filter ("TCP-HX" manufactured by Advantec Toyo Kaisha, Ltd.) and separated into an adsorbent and the solution.

To 200 parts of the filtered solution of the ring-opening polymer of dicyclopentadiene (polymer amount: 30 parts), 100 parts of cyclohexane was added. Then, 0.0043 parts of chlorohydridecarbonyl tris(triphenylphosphine) ruthenium was added to cause a hydrogenation reaction at a hydrogen pressure of 6 MPa and 180° C. for 4 hours. As a result, a reaction liquid containing a hydrogenated product of the ring-opening polymer of dicyclopentadiene was obtained. This reaction liquid was a slurry solution in which the hydrogenated product was deposited.

The hydrogenated product contained in the reaction liquid was separated from the solution by using a centrifugal separator, and dried under reduced pressure at 60° C. for 24 hours, to obtain 28.5 parts of the hydrogenated product of the ring-opening polymer of dicyclopentadiene having crystallizability. The hydrogenation rate of the hydrogenated product was 99% or more, the glass transition temperature Tg was 93° C., the melting point (Tm) was 262° C., and the ratio of a racemo diad was 89%.

In 100 parts of the hydrogenated product of the ring-opening polymer of dicyclopentadiene obtained, 1.1 parts of an antioxidant (tetrakis[methylene-3-(3', 5'-di-t-butyl-4'-hydroxyphenyl) propionate]methane; "Irganox (registered trademark) 1010" available from BASF Japan Ltd.) was mixed. The mixture was charged in a twin-screw extruder provided with four die holes with an inner diameter of 3 mm (trade name "TEM-37B" manufactured by Toshiba Machine Co., Ltd.). The mixture was molded into a strand shape by thermal melt extrusion. The molded body was finely cut into pellets by a strand cutter, to obtain the thermal melt extrusion molded body in a pellet shape.

The operation conditions for the twin-screw extruder are itemized in the following:
Barrel set temperature=270 to 280° C.
Die set temperature=250° C.
Screw rotation speed=145 rpm
Feeder rotation speed=50 rpm Production Example 2-1: Production of Primary Film 1

Using a thermal melt extrusion film molding device equipped with a T die (trade name "Measuring Extruder Type Me-20/2800V3" manufactured by Optical Control System GmbH), the molded body in a pellet shape obtained in Production Example 1 was made in a form of a film having a thickness of 200 μm and a width of 120 mm, and wound at a speed of 1.5 m/min into a roll, to obtain a film molded body (hereinafter referred to as primary film 1).

The operation conditions for the film molding device are itemized in the following:
Barrel set temperature=280° C. to 290° C.
Die set temperature=270° C.
Screw rotation speed=30 rpm Production Example 2-2: Production of Primary Film 2

A film molded body having a thickness of 25 μm and a width of 120 mm (hereinafter referred to as primary film 2) was obtained by the same operation as that in Production Example 2-1 except that the film winding speed was changed to 12 m/min.

Hereinafter, the roll winding direction of the primary films 1 and 2 (lengthwise direction of the primary film) is referred to as MD direction, and the widthwise direction of the primary films 1 and 2 is referred to as TD direction. The directions of a film will be referred to on the basis of these directions.

Production Example 3: Production of Second Film A

The primary film 1 obtained in Production Example 2-1 was cut into a shape of a square of 30 cm×30 cm. Upon cutting, of two pairs of opposite sides, one pair of sides were made in a direction parallel to the MD direction, and another pair of sides were made in a direction parallel to the TD direction. The cut primary film 1 was subjected to simultaneous biaxial stretching in the MD and TD directions by using a biaxial stretching device (the biaxial stretching device EX10-B manufactured by Toyo Seiki Seisaku-sho, Ltd., hereinafter the same shall apply). The stretching temperature was 110° C., and the stretching ratio in each of MD and TD directions was 2 times. As a result, a second film A was obtained.

The obtained second film A was placed in an oven of 123° C. (i.e., (Tg+30° C.), and heated until shrinkage was completed. After the shrinkage was completed, the shrinkage percentages in the MD and TD directions were measured, and both were found to be 36%.

Production Example 4: Production of Second Film B

The primary film 1 obtained in Production Example 2-1 was cut into a shape of a square of 15 cm×15 cm. Upon cutting, of two pairs of opposite sides, one pair of sides were made in a direction parallel to the MD direction, and another pair of sides were made in a direction parallel to the TD direction. The cut primary film 1 was subjected to fixed-end uniaxial stretching in the MD direction by using a biaxial stretching device. The stretching temperature was 110° C., and the stretching ratio was 3 times. As a result, a second film B was obtained.

The obtained second film B was placed in an oven of 123° C., and heated until shrinkage was completed. After shrinkage was completed, the shrinkage percentages in the MD and TD directions were measured. The shrinkage percentage in the MD direction was 45%, and the shrinkage percentage in the TD direction was 7%.

Production Example 5: Production of Second Film C

A second film C was obtained in the same manner as that in the production of the second film A in Production Example 3 except that a roll-shaped film formed of a resin containing an alicyclic structure-containing polymer (trade name: ZEONOR Film ZF14-100 available from ZEON Corporation, thickness: 100 μm, glass transition temperature: 137° C.) was used in place of the primary film 1, and the stretching temperature was changed to 145° C.

The obtained second film C was placed in an oven of 167° C. (i.e., (Tg+30° C.), and heated until shrinkage was completed. After shrinkage was completed, the shrinkage percentages in the MD and TD directions were measured, and both were found to be 31%.

Example 1

(1-1. Bonding Step)

The primary film 2 obtained in Production Example 2-2 was cut into a square of 30 cm×30 cm. Thus, a first film was obtained. Upon cutting, of two pairs of opposite sides, one pair of sides were made in a direction parallel to the MD direction, and another pair of sides were made in a direction parallel to the TD direction. To both surfaces of the first film, the second film A obtained in Production Example 3 (the cut film of 30 cm×30 cm; of two pairs of opposite sides, one pair of sides were in a direction parallel to the MD direction, and another pair of sides were in a direction parallel to the TD direction) was bonded. The bonding was performed via an acrylic adhesive layer having a thickness of 20 μm. The bonding was performed such that the MD direction of the second film A was parallel to the MD direction of the first film. As a result, a third film having a layer structure of (second film A)/(adhesive layer)/(first film)/(adhesive layer)/(second film A).

(1-2. Shrinking Step)

The third film obtained in (1-1) was attached to a biaxial stretching device. The attachment was performed such that the four sides of the third film were gripped with nine clamps per side of the third film while a tension was applied to the third film to a degree whereby slack of the film did not occur.

Subsequently, both surfaces of the third film were heated, and simultaneously the clamps gripping the third film were shifted. Thus, the third film was allowed to shrink while the third film was kept in a non-slack state. At that time, the heating was performed by placing plate heaters of 120° C. at a proximity of 5 mm distance from the both surfaces of the third film, and heating the surroundings of the third film to 120° C. The shifting of the clamps was performed by decreasing a distance between a clamp group of the clamps gripping one side of two sides parallel to the TD direction and a clamp group of the clamps gripping the other side (i.e., a distance between the clamps in the MD direction), and a distance between a clamp group of the clamps gripping one side of two sides parallel to the MD direction and a clamp group of the clamps gripping the other side (i.e., a distance between the clamps in the TD direction) at a speed of 5 cm/min. The heating and the shifting of the clamps were continued until the stretching percentages in the MD and TD directions reached target values. The target stretching percentages in the MD and TD directions were both −20% (i.e., the shrinkage percentages were 20%). Thus, the third film was shrunk to obtain a fourth film.

(1-3. Secondary Heating Step)

The fourth film obtained in (1-2) was attached to a biaxial stretching device by effecting gripping of four sides thereof with clamps. While the size of the fourth film was fixed, the fourth film was heated for 60 seconds. The heating was performed by maintaining plate heaters at a proximity of 5 mm distance from the both surfaces of the fourth film, and the temperature of the plate heaters was set to 200° C., so that the surroundings of the fourth film were heated to 200° C.

(1-4. Post-treatment and Evaluation)

After completion of the secondary heating step (1-3), the film was detached from the biaxial stretching device, and the shrunk second films and the shrunk adhesive layers were peeled off a phase difference film, to obtain the phase difference film. The thickness, Re, Rth, and NZ factor of the obtained phase difference film were measured. The Rth/thickness was calculated.

Example 2

A phase difference film was obtained and evaluated by the same operation as that in Example 1 except that the following change was made.
In the shrinking step (1-2), the target stretching percentages in the MD and TD directions were changed from −20% to −12%.

Example 3

(3-1. Bonding Step)

A third film was obtained in the same manner as that in (1-1) of Example 1 except that the second film B obtained in Production Example 4 was used in place of the second film A obtained in Production Example 3.

(3-2. Shrinking Step)

The third film obtained in (3-1) was attached to a biaxial stretching device. The attachment was performed such that the four sides of the third film were gripped with nine clamps per side of the third film while a tension was applied to the third film to a degree whereby slack of the film did not occur.

Subsequently, both surfaces of the third film were heated, and simultaneously the clamps gripping the third film were shifted. Thus, the third film was allowed to shrink while the third film was kept in a non-slack state. At that time, the heating was performed by placing plate heaters of 120° C. at a proximity of 5 mm distance from the both surfaces of the third film, and heating the surroundings of the third film to 120° C. The shifting of the clamps was performed by decreasing a distance between a clamp group of the clamps gripping one side of two sides parallel to the TD direction and a clamp group of the clamps gripping the other side (i.e., a distance between the clamps in the MD direction) at a speed of 8 cm/min, and increasing a distance between a clamp group of the clamps gripping one side of two sides parallel to the MD direction and a clamp group of the clamps gripping the other side (i.e., a distance between the clamps in the TD direction) at a speed of 6.7 cm/min. The heating and the shifting of the clamps were continued until the stretching percentages in the MD and TD directions reached target values. The target stretching percentage in the TD direction was 25%, and the target stretching percentage in the MD direction was −30% (i.e., the shrinkage percentage was 30%). Thus, the third film was shrunk to obtain a fourth film.

(3-3. Secondary Heating Step, Post-treatment, and Evaluation)

The fourth film obtained in (3-2) was subjected to a secondary heating step, post-treatment, and evaluation in the same manner as those in (1-3) and (1-4) of Example 1.

Example 4

A phase difference film was obtained and evaluated by the same operation as that in Example 3 except that the following changes were made.
In the shrinking step (3-2), the target stretching percentage in the TD direction was changed from 25% to 10%. The target stretching percentage in the MD direction was not changed, i.e., set to −30%.
The speed of increasing the distance between the clamps in the TD direction was changed to 2.7 cm/min. The speed of decreasing the distance between the clamps in the MD direction was not changed, i.e., set to 8 cm/min.

Example 5

A phase difference film was obtained and evaluated by the same operation as that in Example 1 except that the following changes were made.
In the shrinking step (1-1), the target stretching percentage in the MD direction was changed from −20% to −100, and the target stretching percentage in the TD direction was changed from −20% to −25%.
The speed of decreasing the distance between the clamps in the MD direction was changed to 2.8 cm/min, and the speed of decreasing the distance between the clamps in the TD direction was changed to 7 cm/min.

Comparative Example 1

(C1-1. Shrinking Step)

The primary film 2 obtained in Production Example 2-2 was cut into a square of 30 cm×30 cm. Upon cutting, of two pairs of opposite sides, one pair of sides were in a direction parallel to the MD direction, and another pair of sides were in a direction parallel to the TD direction. The cut primary film 2 as it was attached to a biaxial stretching device. The attachment was performed such that two sides parallel to the TD direction (i.e., two opposite sides in the MD direction) of the primary film 2 were gripped with nine clamps per side of the primary film 2 while a tension was applied to the primary film 2 to a degree whereby slack of the film did not occur.

Subsequently, both surfaces of the primary film 2 were heated, and simultaneously the clamps gripping the film were shifted. Thus, the primary film 2 was uniaxially stretched. At that time, the heating was performed by placing plate heaters of 120° C. at a proximity of 5 mm distance from the both surfaces of the primary film 2, and heating the surroundings of the primary film 2 to 120° C. The shifting of the clamps was performed by changing a distance between a clamp group of the clamps gripping one side of two sides parallel to the TD direction and a clamp group of the clamps gripping the other side (i.e., a distance between the clamps in the MD direction) at a speed of 8 cm/min until the stretching percentage in the MD direction was 30%. In the TD direction at a central portion in the MD direction, the shrinkage was performed with the shrinkage percentage being 11% (i.e., the stretching percentage was −11%). As a result, the primary film 2 was stretched in the MD direction, and freely shrunk in the TD direction. Thus, a stretched film was obtained.

(C1-2. Secondary Heating Step)

The stretched film obtained in (C1-1) was attached to a biaxial stretching device by effecting grip of two sides of the stretched film with clamps. While the size of the stretched film was fixed, the stretched film was heated. The heating was performed by maintaining plate heaters at a proximity of 5 mm distance from the both surfaces of the stretched film, and the temperature of the plate heaters was set to 200° C., so that the surroundings of the stretched film were heated to 200° C.

(C1-3. Post-Treatment and Evaluation)

After completion of the secondary heating step (C1-2), the film was detached from the biaxial stretching device. The thickness, Re, Rth, and NZ factor of the obtained film were measured. The Rth/thickness was calculated.

Comparative Example 2

(C2-1. Bonding Step)

A third film was obtained in the same manner as that in (1-1) of Example 1 except that a film of a resin containing an alicyclic structure-containing polymer (trade name "ZEONOR Film ZF-14-40" available from ZEON Corporation, glass transition temperature: 137° C., thickness: 40 μm, any melting point of the polymer was not found by DSC) was used as the first filming place of the primary film 2, and the second film C obtained in Production Example 5 was used as the second film in place of the second film A.

(C2-2. Shrinking Step, Post-Treatment, and Evaluation)

A fourth film was obtained in the same manner as that in the shrinking step (1-2) of Example 1 except that the film obtained in (C2-1) was used as the third film in place of the third film obtained (1-1) and the heating temperature was changed to 150° C. The first film of this Comparative Example was a film that was not crystallized even by heating. Therefore, after completion of the shrinking step, the secondary heating step was not performed, the film was detached from the biaxial stretching device, and the shrunk second films and the shrunk adhesive layers were peeled from a phase difference film (shrunk film formed of the resin containing an alicyclic structure-containing polymer). Thus, the phase difference film was obtained. The thickness, Re, Rth, and NZ factor of the obtained phase difference film were measured. The Rth/thickness was calculated.

The evaluation results of Examples and Comparative Examples are summarized in Table 1.

TABLE 1

| | Resin | Second film | TD stretching percentage (%) | MD stretching percentage (%) | Area shrinkage percentage (%) | Thickness (μm) | Re (nm) | Rth (nm) | NZ factor | Rth/thickness (×10⁻³) |
|---|---|---|---|---|---|---|---|---|---|---|
| Ex. 1 | Prod. Ex. 1 | A | −20 | −20 | 36 | 39 | 1.8 | −435.4 | −241.4 | −11.1 |
| Ex. 2 | Prod. Ex. 1 | A | −12 | −12 | 23 | 32 | 3.1 | −191.5 | −61.3 | −5.9 |
| Ex. 3 | Prod. Ex. 1 | B | 25 | −30 | 13 | 29 | 134.6 | −7.7 | 0.44 | −0.3 |
| Ex. 4 | Prod. Ex. 1 | B | 10 | −30 | 23 | 32 | 89.0 | −41.2 | 0.037 | −1.3 |
| Ex. 5 | Prod. Ex. 1 | A | −10 | −25 | 33 | 37 | 121.9 | −372.2 | −3.1 | −10.0 |
| Comp. Ex. 1 | Prod. Ex. 1 | — | 30 | −11 | −16 | 22 | 74.2 | 40.1 | 1.04 | 2.2 |
| Comp. Ex. 2 | ZEONOR | A | −20 | −20 | 36 | 62 | 6.9 | −119.2 | −16.8 | −1.9 |

As shown in Table 1, in Examples of the present application, phase difference films having a small NZ factor, a small thickness, and high expression of phase difference were easily produced. In particular, the phase difference films of Examples 1 and 2 had properties suitable for a positive C plate, the phase difference film of Example 3 had properties suitable for a three-dimensional phase difference film, and the phase difference film of Example 4 had properties suitable for a negative A plate.

REFERENCE SIGN LIST

100: third film
100s: fourth film
111: second film
111s: shrunk second film
112: second film
112s: shrunk second film
121: first film
121s: shrunk first film
131: adhesive layer
131s: shrunk adhesive layer
132: adhesive layer
132s: shrunk adhesive layer

The invention claimed is:

1. A phase difference film formed of a resin containing a polymer having crystallizability with a crystallization degree of 15% or more, the phase difference film having an NZ factor of less than 1, and having an in-plane retardation Re that satisfies 125 nm≤Re≤345 nm.

2. The phase difference film according to claim 1, having a haze of 10% or less.

3. The phase difference film according to claim 1, having an NZ factor of 0<Nz<1.

4. The phase difference film according to claim 1, having a ratio of a racemo diad of 51% or more.

5. A method for producing the phase difference film according to claim 1, comprising:
   (1) a bonding step of bonding a second film to one or both surfaces of a first film formed of a resin containing the polymer having crystallizability and having a glass transition temperature Tg (° C.) and a melting point Tm (° C.), to obtain a third film, the second film having a shrinkage percentage in at least one direction at (Tg+30)° C. of 5% or more and 50% or less;

(2) a shrinking step of heating the third film to Tg° C. or higher and (Tg+30)° C. or lower, to cause shrinkage of the third film in at least one direction so that an area thereof is decreased by 5% or more and 50% or less, to obtain a fourth film; and (3) a secondary heating step of heating the fourth film to (Tg+50)° C. or higher and (Tm−40)° C. or lower.

6. A phase difference film formed of a resin containing a polymer having crystallizability with a crystallization degree of 15% or more, the phase difference film having an NZ factor of less than 1, and having an in-plane retardation Re that satisfies 125 nm≤Re≤345 nm, wherein the polymer is an alicyclic structure-containing polymer being a hydrogenated product of a ring-opening polymer of dicyclopentadiene.

7. The phase difference film according to claim 6, having a haze of 10% or less.

8. The phase difference film according to claim 6, having an NZ factor of 0<Nz<1.

9. The phase difference film according to claim 6, having a ratio of a racemo diad of 51% or more.

10. A method for producing the phase difference film according to claim 6, comprising:

(1) a bonding step of bonding a second film to one or both surfaces of a first film formed of a resin containing the polymer having crystallizability and having a glass transition temperature Tg (° C.) and a melting point Tm (° C.), to obtain a third film, the second film having a shrinkage percentage in at least one direction at (Tg+30)° C. of 5% or more and 50% or less;

(2) a shrinking step of heating the third film to Tg° C. or higher and (Tg+30)° C. or lower, to cause shrinkage of the third film in at least one direction so that an area thereof is decreased by 5% or more and 50% or less, to obtain a fourth film; and (3) a secondary heating step of heating the fourth film to (Tg+50)° C. or higher and (Tm−40)° C. or lower.

\* \* \* \* \*